(12) United States Patent
Headley et al.

(10) Patent No.: US 7,584,484 B2
(45) Date of Patent: Sep. 1, 2009

(54) METHODS AND APPARATUS FOR COLLECTING MEDIA CONSUMPTION DATA BASED ON USAGE INFORMATION

(75) Inventors: Weston P. Headley, Battle Ground, WA (US); Kevin Deng, Safety Harbor, FL (US); Dan Nelson, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 138 days.

(21) Appl. No.: 11/951,864

(22) Filed: Dec. 6, 2007

(65) Prior Publication Data

US 2009/0007169 A1 Jan. 1, 2009

Related U.S. Application Data

(63) Continuation of application No. PCT/US2005/019389, filed on Jun. 2, 2005.

(51) Int. Cl.
*H04N 60/33* (2006.01)
*H04N 60/45* (2006.01)

(52) U.S. Cl. .............. 725/19; 725/12; 725/14; 725/16; 725/18; 725/20

(58) Field of Classification Search .............. 725/10–20
See application file for complete search history.

(56) References Cited

U.S. PATENT DOCUMENTS

| 4,876,736 | A | 10/1989 | Kiewit |
|---|---|---|---|
| 5,382,970 | A | 1/1995 | Kiefl |
| 5,481,294 | A | 1/1996 | Thomas et al. |
| 5,574,963 | A | 11/1996 | Weinblatt et al. |
| 5,579,124 | A | 11/1996 | Aijala et al. |
| 5,809,407 | A | 9/1998 | Kasperkovitz et al. |
| 5,826,164 | A | 10/1998 | Weinblatt |
| 6,484,316 | B1 | 11/2002 | Lindberg |
| 6,516,189 | B1 | 2/2003 | Frangione et al. |
| 6,647,548 | B1 | 11/2003 | Lu et al. |
| 6,745,011 | B1 | 6/2004 | Hendrickson et al. |
| 6,754,470 | B2 | 6/2004 | Hendrickson et al. |
| 6,888,457 | B2 | 5/2005 | Wilkinson et al. |
| 6,941,324 | B2 | 9/2005 | Plastina et al. |

(Continued)

FOREIGN PATENT DOCUMENTS

WO 9417609 8/1994

OTHER PUBLICATIONS

International Search Report and Written Opinion for corresponding international patent application No. PCT/US05/19389, Mailed on May 1, 2007, 8 pages.

*Primary Examiner*—Hunter B. Lonsberry
(74) *Attorney, Agent, or Firm*—Hanley, Flight & Zimmerman, LLC

(57) ABSTRACT

Methods and apparatus for collecting media consumption data based on usage information of a media delivery device are disclosed. In an example method, media information is received by a portable metering device associated with a monitored individual such as a portable telephone, a personal digital assistant, and/or a handheld computer. Usage information indicative of a media delivery event associated with a media delivery device such as a television is monitored by the portable metering device. To form the media consumption data, the media information is associated with one of a first channel and a second channel based on the usage information.

67 Claims, 8 Drawing Sheets

U.S. PATENT DOCUMENTS

| | | |
|---|---|---|
| 7,109,876 B2 | 9/2006 | Smith et al. |
| 7,181,159 B2 | 2/2007 | Breen |
| 7,220,910 B2 | 5/2007 | Plastina et al. |
| 7,222,071 B2 | 5/2007 | Neuhauser et al. |
| 7,239,981 B2 | 7/2007 | Kolessar et al. |
| 7,302,468 B2 | 11/2007 | Wijeratne |
| 7,316,025 B1 | 1/2008 | Aijala et al. |
| 2003/0005433 A1 | 1/2003 | Janik et al. |
| 2003/0170001 A1 | 9/2003 | Breen |
| 2003/0171833 A1 | 9/2003 | Crystal et al. |
| 2005/0027466 A1 | 2/2005 | Steinmetz et al. |
| 2005/0144632 A1 | 6/2005 | Mears et al. |
| 2007/0006250 A1 | 1/2007 | Croy et al. |
| 2007/0219937 A1 | 9/2007 | Lee et al. |
| 2008/0155582 A1 | 6/2008 | Sokola et al. |

| SID | CHANNEL |
|---|---|
| 100 | ABC |
| 110 | CBS |
| 120 | NBC |

...

| 199 | FOX |
| 230 | CNN |
| 243 | ESPN |
| 244 | ESPN2 |
| 250 | FSN |
| 300 | MTV |

METHODS AND APPARATUS FOR COLLECTING MEDIA CONSUMPTION DATA BASED ON USAGE INFORMATION

RELATED APPLICATION

This application is a continuation of International Patent Application No. PCT/US05/019389, filed on Jun. 2, 2005, the entire disclosure of which is incorporated herein by reference.

TECHNICAL FIELD

The present disclosure relates generally to media metering, and more particularly, to methods and an apparatus for collecting media consumption data based on usage information of a media delivery device.

BACKGROUND

Audience measurements of media, such as television and/or radio programs, are typically carried out by monitoring or measuring media consumption (e.g., the viewing of or listening to audio/video content) within households that are statistically selected to represent particular demographic groups, geographic regions, etc. Using various statistical methods, the collected media consumption data may be processed to determine audience size and demographics for media presentations or programs of interest. Such audience size and demographic information may be valuable to advertisers, broadcasters and any other media delivery entity or service provider that wants to know an audience size and demographic associated with a particular program. For example, audience size and demographic information is a significant factor in the development of improved program lineups, the placement of advertisements targeted at a particular demographic, as well as in valuing commercial time slots during particular programs.

DETAILED DESCRIPTION

In general, methods and apparatus for collecting media consumption data based on usage information of a media delivery device are disclosed herein. The example methods and apparatus disclosed herein may be used to receive media information such as, for example, a video code, an audio code, a video signature, an audio signature, and other media measurement information at a portable metering device associated with a monitored individual. The portable metering device monitors for usage information indicative of a media delivery event associated with the media delivery device such as, for example, a tuning event and/or an operating mode event. For example, the media delivery event may be a change in channel to which the media delivery device is tuned. Other media delivery events may include an initiation of an operating mode (e.g., a mute mode, a picture-in-picture (PIP) mode, a split screen mode, a personal computer (PC) mode, a headphones/earphones mode, etc.) of the media delivery device. Based on the usage information, the portable metering device associates the media information with one of a first channel and a second channel to form the media consumption data. For example, the portable metering device may associate the media information with a previously tuned channel or a newly tuned channel. As described herein, the portable metering device may employ information relating to a media delivery device to supplement probability protocols and/or other known techniques to more accurately collect media consumption data.

Figure 1:
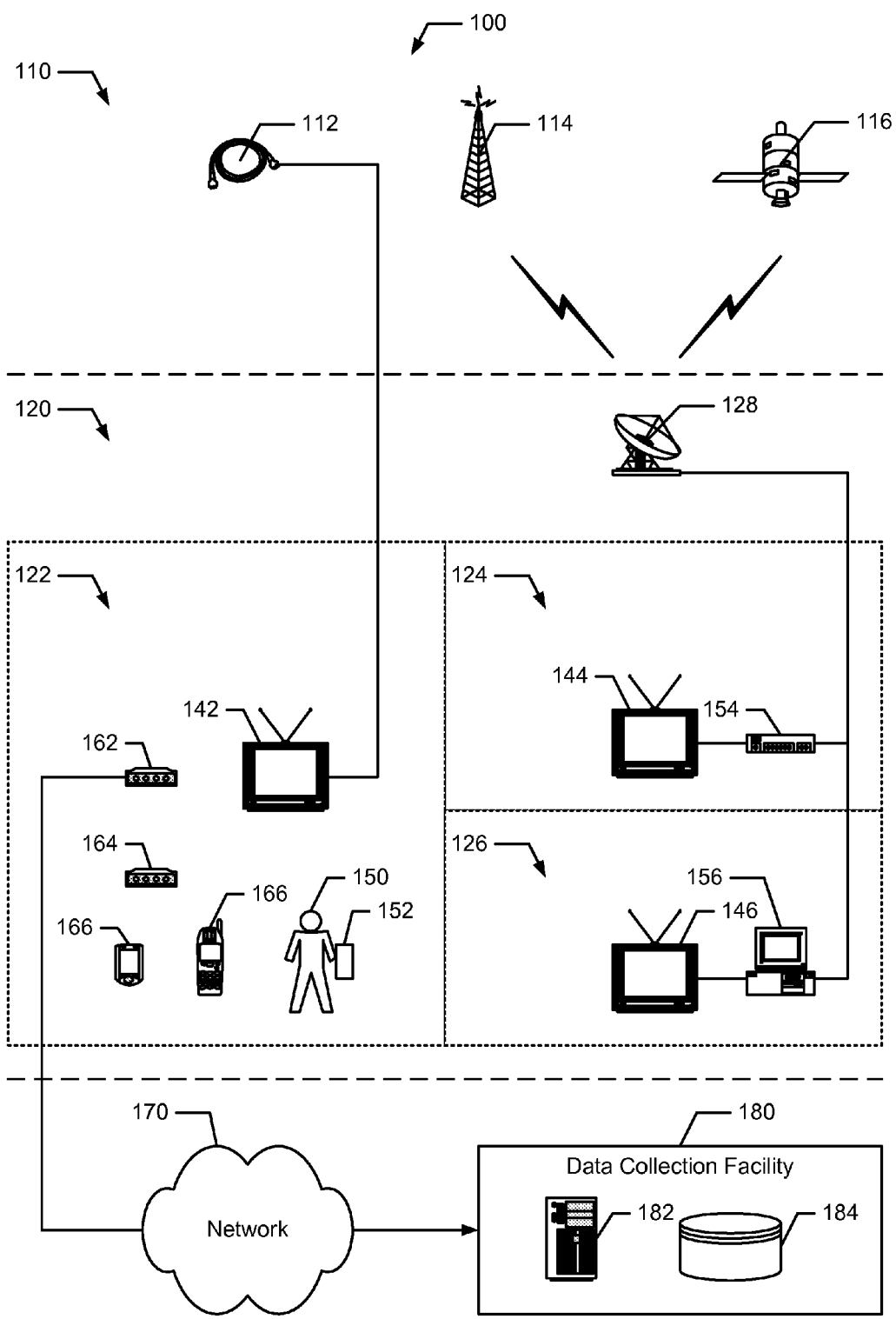
FIG. 1 depicts an example media monitoring system.

FIG. 1 depicts an example media monitoring system 100 including a media service provider 110, which may be, for example a television service provider, a radio program service provider, an Internet media service provider, etc. The media service provider 110 may include a cable network 112, one or more radio towers or transmitters 114, and one or more satellites 116. For example, in the case where the media service provider 110 is a cable television provider, the media service provider 110 may distribute television program signals primarily or exclusively via the cable network 112. In the case where the media service provider 110 is a satellite broadcast service, the media service provider 110 may deliver media signals to consumers directly via the one or more satellites 116 without using the cable network 112 or the radio towers 114.

The media service provider 110 may transmit media signals in any suitable format such as a National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc.

The media monitoring system 100 also includes one or more households that receive media signals from the media service provider 110. An example household 120 is depicted as having a plurality of internal locations, rooms or media consumption spaces 122, 124 and 126. Of course, other households (not shown) may have more or fewer locations or media consumption spaces than those depicted in connection with the example household 120.

As is common, one or more of the locations within a household may include none, one, or more than one media delivery or presentation device such as, for example, a television, a radio or the like. In the example household 120, each of the consumption spaces or locations 122, 124 and 126 includes a respective television 142, 144 and 146. However, if desired, more or fewer televisions, radios, or any other media presentation or delivery devices may be placed within one or more of the locations 122, 124 and 126. The household 120 may be occupied by one or more audience members or panelists 150 that have enlisted to participate in media monitoring activities. The audience members or panelists 150 may have access to a remote control device 152 that facilitates the changing of the channel to which one or more of the televisions 142, 144 and 146 are tuned. The remote control device 152 may also facilitate the changing of the audio output or volume of one or more of the televisions 142, 144 and 146. Further, the remote control device 152 may be used to navigate through setup menus and/or to enable/disable an operating mode of the televisions 142, 144 and 146 such as, for example, a mute mode, a PIP mode, a split screen mode, a PC mode, etc. The televisions 142, 144 and 146 may receive a plurality of broadcast signals transmitted via a plurality of channels by the service provider 110 and may be adapted to process and display television signals. For example, the television 142 may receive a plurality of broadcast signals from the cable network 112. As other examples, the television 144 may receive a plurality of broadcast signals from the radio towers 114 and/or the satellites 116 via a receiving unit 154 (e.g., a set top box (STB), a personal video recorder (PVR), a digital video recorder (DVR), etc.), and the television 146 may receive a plurality of broadcast signals from radio towers 114 and/or the satellites 116 via a multimedia PC 156.

To monitor the media consumption activities of the panelists 150, a base metering device 162 and a people metering device 164 are operatively coupled to the television 142. Additional base metering devices (not shown) may be similarly coupled to the other televisions 144 and 146. In addition, each of the panelists 150 is assigned a portable metering device 166 that may be carried (e.g., worn on a belt, hand carried, etc.) by the panelists 150 as they move throughout the household 120 and, in some cases, outside of the household 120.

As described in greater detail below, the portable metering device 166 may be configured to collect signatures and/or to detect and process codes embedded in signals received from one or more of the televisions 142, 144 and 146. The media information collected by the portable metering device 166 may be associated with a channel to which a media delivery device (e.g., the televisions 142, 144 and 146) is tuned.

The processing performed by the televisions 142, 144 and 146 may include, for example, extracting a video component delivered via the received signal and an audio component delivered via the received signal, causing the video component to be displayed or presented on a screen/display associated with the televisions 142, 144 and 146, and causing the audio component to be emitted by speakers associated with the televisions. The media content contained in the television signal(s) may include, for example, a television program, a movie, an advertisement, a video game, a still image, and/or a preview of other programming that is or will be offered by the media service provider 110 now or in the future.

The base metering device 162 is configured as a relatively stationary device disposed on or near the television 142 and may be adapted to perform one or more of a variety of well-known television metering methods, some of which are described in U.S. Pat. No. 5,481,294. Depending on the types of metering that the base metering device 162 is adapted to perform, the base metering device 162 may be physically coupled to the television 142 or may instead be configured to capture signals emitted by the television 142 so that direct physical coupling of the base metering device 162 to the television 142 is not required. As noted above, in addition to the television 142, a base metering device 162 may also be provided for the televisions 144 and 146 to facilitate the capture of all in-home media consumption by the panelists 150. In one example, the base metering device 162 may be implemented as a low-cost electronic device that may be shipped to the household (e.g., via regular mail) and easily installed by the panelist 150 by, for example, plugging the base metering device 162 into an electrical outlet.

The portable metering device 166 is generally configured to perform television and/or radio metering using audio code capture techniques and/or audio signature capture techniques, some of which are described in U.S. Pat. No. 5,481,294. In some examples, the portable metering device 166 may be adapted to capture code information and signature information simultaneously. Alternatively, the portable metering device 166 may be adapted to use the code techniques as a primary metering method and to use the signature metering techniques as a secondary method to supplement code-based metering. Specifically, if one or more audio codes are detected by the portable metering device 166, then the signature method need not be performed. Conversely, if audio codes are not detected, then the portable metering device 166 may perform one or more well-known methods to capture signature information of the programming delivered by one or more of the televisions 142, 144 and 146. Regardless of the manner in which the portable metering device 166 is configured, each audience member (e.g., the audience member or panelist 150) preferably carries a portable metering device (e.g., similar or identical to the device 166) at all times.

In general, as the audience member or panelist 150 moves within the household 120 and, in particular, as the panelist 150 moves among the locations 122, 124 and 126, the panelist 150 carries the portable metering device 166. In some instances, the panelist 150 may hand carry the portable metering device 166 and, in other cases, the portable metering device 166 may be belt worn or otherwise attached to the clothing or body of the panelist 150. In some examples, the portable metering device 166 detects and processes codes embedded in the audio signals presented or delivered by a media delivery device or devices located in the same consumption space or room in which the panelist 150 and the portable metering device 166 are located. For example, if the panelist 150 carries the portable metering device 166 into the consumption space 122, the portable metering device 166 may detect and process codes contained within media signals (e.g., audio signals) it receives from the television 142.

The base metering device 162 and the portable metering device 166 may be adapted to communicate with a remotely located central data collection facility 180 via a network 170. The network 170 may be implemented using any type of public or private network such as, but not limited to, the Internet, a telephone network, a local area network (LAN), a cable network, and/or a wireless network. To enable communication via the network 170, the base metering device 162 may include a communication interface that enables connection to an Ethernet, a digital subscriber line (DSL), a telephone line, a coaxial cable, or any wireless connection, etc. Likewise, the portable metering device 166 may include such an interface to enable communication by the portable metering device 166 via the network 170. Either or both of the base metering device 162 and the portable metering device 166 may be adapted to send media consumption data to the central data collection facility 180. In the event that only one of the base metering device 162 and the portable metering device 166 is capable of transmitting data (e.g., detected codes, time stamps, location data, etc.) to the central data collection facility 180, the base metering device 162 and the portable metering devices 166 may be adapted to communicate data to each other so that there is a means by which data collected from all metering devices (i.e., the base metering device 162 and/or the portable metering device 166) can be transmitted to the central data collection facility 180. The central data collection facility 180 may include a server 182 and a database 184. Further, the central data collection facility 180 may be adapted to process and store data received from the base metering device 162 and/or the portable metering device 166.

The portable metering device 166 may also communicate via the network 170 using a docking station (not shown) having a cradle in which the portable metering device 166 may be placed to enable transfer of data via the network 170 and to enable a battery (not shown) disposed in the portable metering device 166 to be recharged. The docking station may be operatively coupled to the network 170 via, for example, an Ethernet connection, a digital subscriber line (DSL), a telephone line, a coaxial cable, etc.

In the illustrated example, the portable metering device 166 is a portable electronic device such as, but not limited to, a portable telephone, a personal digital assistant (PDA), and/or a handheld computer. Because of its portability, the portable metering device 166 may be used to meter media consumption that occurs at home, at the office, and/or any other location within or outside of the household 120. For example, the portable metering device 166 may be configured to detect codes contained within a movie and/or a movie preview at a movie theater, audio programs delivered within an automobile, radio programs delivered at a bar, restaurant, or other private or public facility, etc.

In the case where a portable telephone platform is used to implement the portable metering device 166, the portable metering device 166 may be configured to operate in accordance with any wireless communication protocol such as, but not limited to, a code division multiple access (CDMA) based communication protocol, a time division multiple access (TDMA) based communication protocol, a global system for mobile communication (GSM) based communication protocol, a general packet radio services (GPRS) based communication protocol, an enhanced data GSM environment (EDGE) based communication protocol, a universal mobile telephone service (UMTS) based communication protocol, a wireless application protocol (WAP), or any other suitable wireless communication protocol. The communication capabilities of the portable telephone may be used to enable communication of data from the portable metering device 166 to the central data collection facility 180 via the network 170. Using a portable telephone platform to implement the portable metering device 166 may allow the panelist 150 to meet the research compliance requirements more easily and more conveniently. Specifically, the panelist 150 may already carry a portable telephone on a regular basis and, as a result, carrying a portable metering device 166 implemented using a portable telephone (e.g., a cellular telephone) does not place any additional duties upon the panelist 150. Alternatively, other hardware/software platforms such as, for example, a personal data assistant (PDA) or handheld computer may be used to implement the portable metering device 166 as is disclosed in U.S. patent application Ser. No. 10/970,585 and PCT Patent Application No. US04/034251.

As is disclosed in U.S. patent application Ser. No. 10/970,585 and PCT Patent Application No. US04/034251, the media monitoring system 100 may be configured so that the base metering device 162 is adapted to be the primary source to collect all in-home media consumption data and the portable metering device 166 is used as the primary source to collect all out-of-home media consumption data. In yet another embodiment, the base metering device 162 may meter all in-home media consumption, and the portable metering device 166 may meter all in-home and out-of-home media consumption and duplicate consumption data sets collected for in-home consumption may be compared and processed to ensure that such data is credited to reflect only a single consumption (e.g., viewing, listening, etc.) The redundant sets of data may also be used to identify discrepancies between the data and to eliminate data believed to be erroneous.

In yet another example, the media monitoring system 100 may be configured so that the base metering device 162 detects the presence and absence of the portable metering device 166 and uses that presence information to determine whether metering is necessary. For example, if the base metering device 162 determines that the television 142 is turned on but there is no portable metering device 166 located in the viewing area then the base metering device 162 may begin metering the programming delivered via the television 142. Conversely, if the base metering device 162 detects a portable metering device 166 in the consumption area 122, then the base metering device 162 may halt monitoring.

In another embodiment, if the base metering device 162 detects the portable metering device 166 in the consumption area 122, then the base metering device 162 may halt monitoring and begin emitting a signal detectable by all portable metering devices 166 located in the consumption area 122. The portable metering device 166 may respond to the signal emitted by the base metering device 162 by causing the subsequently collected data to be identified or tagged as in-home consumption data (i.e., data associated with media consumption within a monitored area), thereby allowing data collected via the portable metering device 166 in connection with in-home media consumption to be distinguishable from data collected by the portable metering device 166 in connection with out-of-home media consumption (i.e., data associated with media consumption outside of the monitored area).

While the components shown in FIG. 1 are depicted as separate structures within the media monitoring system 100, the functions performed by some of these structures may be integrated within a single unit or may be implemented using two or more separate components. For example, although the television 144 and the receiving unit 154 (e.g., STB) are depicted as separate structures, the television 144 and the receiving unit 154 may be integrated into a single unit (e.g., an integrated digital TV set).

Figures 2, 3:
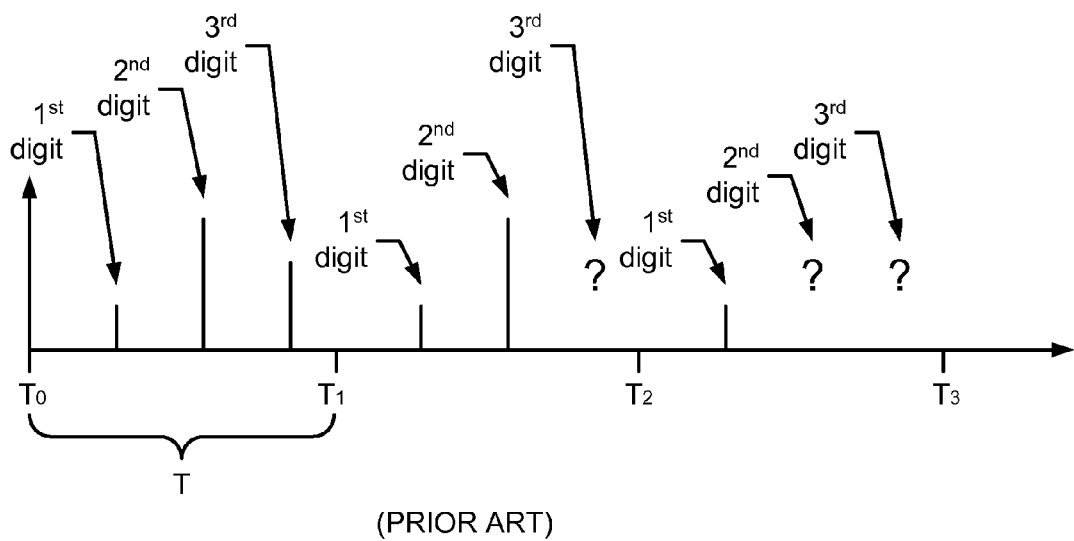
FIG. 2 is a timing diagram representation of one manner in which the example media monitoring system of FIG. 1 may receive partial codes.
FIG. 3 depicts an example index that maps source identification (SID) numbers to broadcast channels.

Typically, portable metering devices capture a complete channel code (e.g., an embedded ancillary code) to identify and/or verify a channel to which a media delivery device is tuned. Referring to FIG. 2, for example, the portable metering device 166 may receive a complete channel code during a period from $T_0$ to $T_1$. The complete channel code may be used to identify a channel to which the television 142 is tuned (i.e., a tuned channel). For example, the channel code may be a 3-digit source identification (SID) number corresponding to a channel. While three-digit SIDs are shown in the example of FIG. 2, SIDs having more or fewer digits may be used instead. In any case, the portable metering device 166 may store an index, a list, a table, etc. of one or more SIDs (e.g., the example index 300 of FIG. 3) to identify a channel to which the television 142 is currently tuned. Accordingly, the portable metering device 166 may associate collected media information with the tuned channel based on the SID. However, the portable metering device 166 may receive a partial SID (e.g., an incomplete channel code) if a sufficient amount of time has not been provided to capture a complete SID and/or if one or more portions (e.g., bits) of a captured SID are incorrect, indeterminate or otherwise corrupt.

Instead of having to capture a complete SID (e.g., all three digits of the SID) to detect a tuned channel, the portable metering device 166 may use a probability protocol or algorithm to speculatively fill in any missing portion(s) of the SID as described in detail below and in conjunction with FIG. 4. Thus, the portable metering device 166 can identify the SID without having to receive the complete (e.g., all three digits of the SID). In some applications, for example, the probability protocol or algorithm enables the portable metering device 166 to predict (using a partial SID) that a currently tuned channel is the same as a previously tuned channel.

Figure 4:
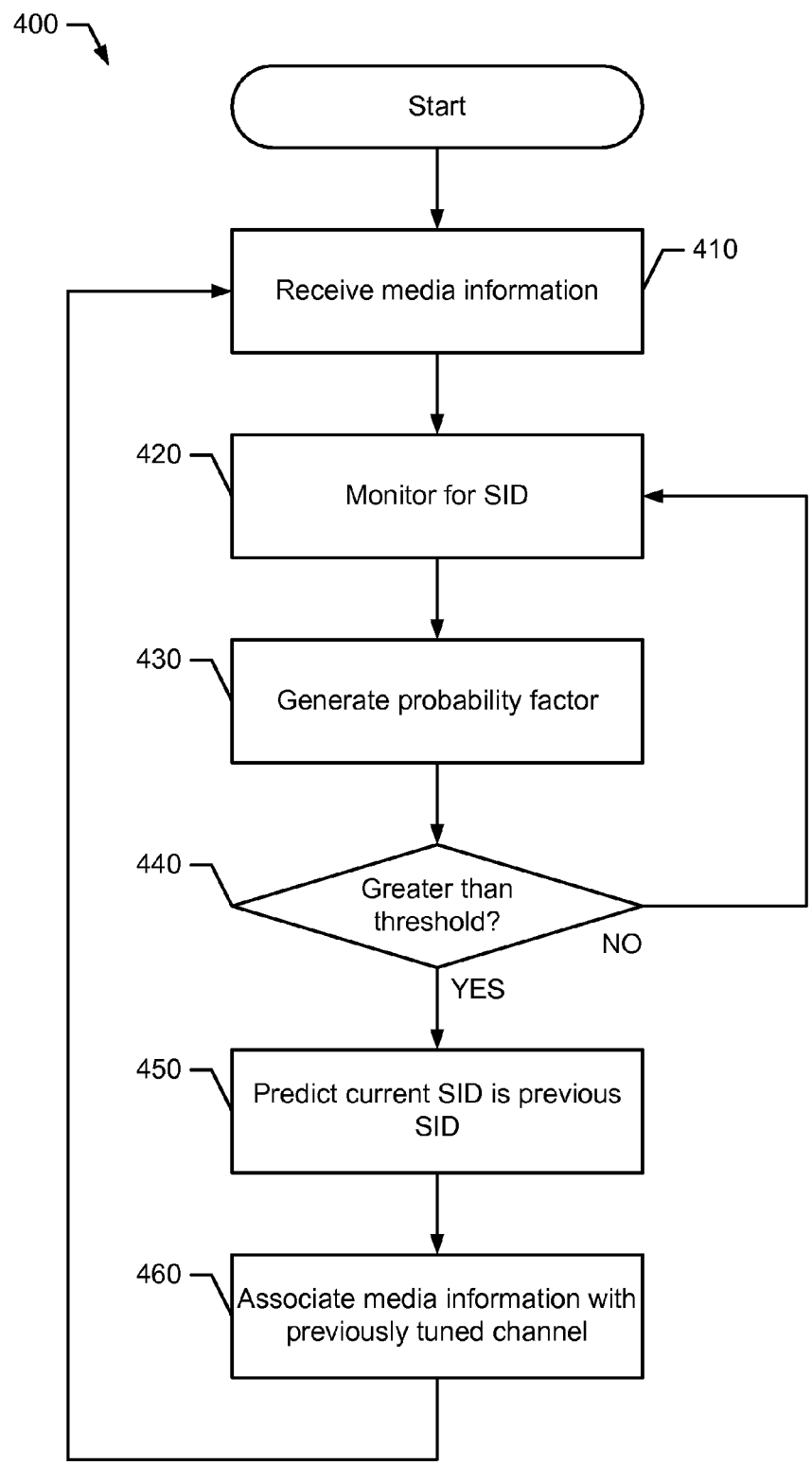
FIG. 4 is a flow diagram representation of one manner in which the example media monitoring system of FIG. 1 may implement an example probability protocol or algorithm.

In the example of FIG. 4, the process 400 begins with the portable metering device 166 receiving media information from the television 142 (block 410). The portable metering device 166 is configured to collect media consumption data by associating the received media information with a channel to which the television 142 is tuned (e.g., a tuned channel). Accordingly, the portable metering device 166 may monitor for a current SID corresponding to the currently tuned channel (block 420). As noted above, the portable metering device 166 may implement a probability protocol or algorithm to predict and identify the current SID in cases where the entire or complete sequence (e.g., all the bits, characters, etc.) of the current SID are not received by the portable metering device 166. Based on a received portion of the current SID, the portable metering device 166 may, for example, generate a probability factor indicative of the likelihood that the current SID is the same as a SID corresponding to a previously tuned channel (i.e., a previous SID) (block 430).

Referring back to FIG. 2, for example, the portable metering device 166 may receive a complete SID with all three digits during a period from $T_0$ to $T_1$ (i.e., the previous SID). In particular, the portable metering device 166 may receive SID 243, which corresponds to the ESPN channel. However, during a period from $T_1$ to $T_2$, the portable metering device 166 may receive only a portion of a SID (i.e., an incomplete current SID). In particular, the portable metering device 166 may receive only two out of the three digits of the current SID. For example, the portable metering device 166 may receive the first and second digits but not the third digit of the current SID. Without all three digits, the portable metering device 166 may not be able to identify the current SID and, thus, the tuned channel associated with the current SID. As noted above, the portable metering device 166 may implement a probability protocol or algorithm to speculatively fill in the missing portion(s) of the current SID and determine the likelihood that the current SID is the same as the previous SID.

The portable metering device 166 may generate a probability factor based on the received portion of the current SID. The probability factor is indicative of the likelihood that the current SID is the same as the previous SID. The portable metering device 166 generates the probability factor based on the previous SID because the portable metering device 166 captured all three digits of the previous SID (i.e., a complete SID). For example, the portable metering device 166 may receive a first digit "2" and a second digit "4" but not a third digit of the current SID. As shown in the example index 300, two channels correspond to a SID having a "2" as a first digit and a "4" as a second digit (i.e., SIDs 243 and 244). Accordingly, the third digit of the current SID may be either a "3" or a "4." In that case, the portable metering device 166 may generate a probability factor of 0.5 because the current SID may be either SID 243 or SID 244.

Referring back to FIG. 4, the portable metering device 166 may be configured to predict that the current SID is the same as the previous SID if the probability factor is greater than a predefined probability threshold (block 440). The probability threshold may be selected to balance the accuracy of the SID prediction against the length of the capture period, the quality, or characteristics of the communications, etc. In general, a higher probability threshold tends to increase the accuracy of the SID prediction. In contrast, a lower probability threshold tends to reduce the accuracy of the SID prediction. If the predefined probability threshold is 0.3, for example, the portable metering device 166 may predict that the current SID is the previous SID of 243 because the probability factor of 0.5 is greater than the predefined probability threshold of 0.3 (block 450). Thus, the portable metering device 166 may associate media information received during the period from $T_1$ to $T_2$ with the previously tuned channel of ESPN (block 460).

Otherwise, if the probability factor is less than or equal to the predefined probability threshold (block 440), the portable metering device 166 may return to block 420 to monitor for missing portion(s) of the current SID or for another SID sequence. As another example, the portable metering device 166 may receive only a first digit of "2" but not the second and third digits of a SID corresponding to a tuned channel during the period from $T_2$ to $T_3$ (i.e., the current SID). In this case, the probability factor is relative to the SID corresponding to the tuned channel during the period from $T_1$ to $T_2$ (i.e., the previously SID). As shown in the index 300, four channels correspond to a SID with a first digit of "2" (i.e., SIDs 230, 243, 244, and 250). Accordingly, the portable metering device 166 may generate a probability factor of 0.25 (block 430). If the probability threshold is selected to be 0.3, the portable metering device 166 will not predict that the current SID is the previous SID because the probability factor of 0.25 generated at block 430 is less than the predefined probability threshold of 0.3. In that case, the portable metering device 166 returns control to block 420 to monitor for missing portion(s) of the current SID or for another SID sequence.

Alternatively, the process of FIG. 4 may determine whether the portion of the current SID received at block 420 is greater than or equal to a threshold indicative of a sufficient quantity of code associated with the current SID to generate the probability factor (e.g., a minimum amount of code). For example, the portable metering device 166 may be required to receive 50% of the code associated with a SID before the probability factor can be generated. If the received portion of code is greater than the threshold, the process of FIG. 4 may proceed to generate the probability factor as described in connection with block 430. Otherwise, if the received portion is less than the threshold, control returns to block 420 to monitor for more code portions associated with the current SID to reach the minimum amount before generating the probability factor at block 430.

Figure 5:
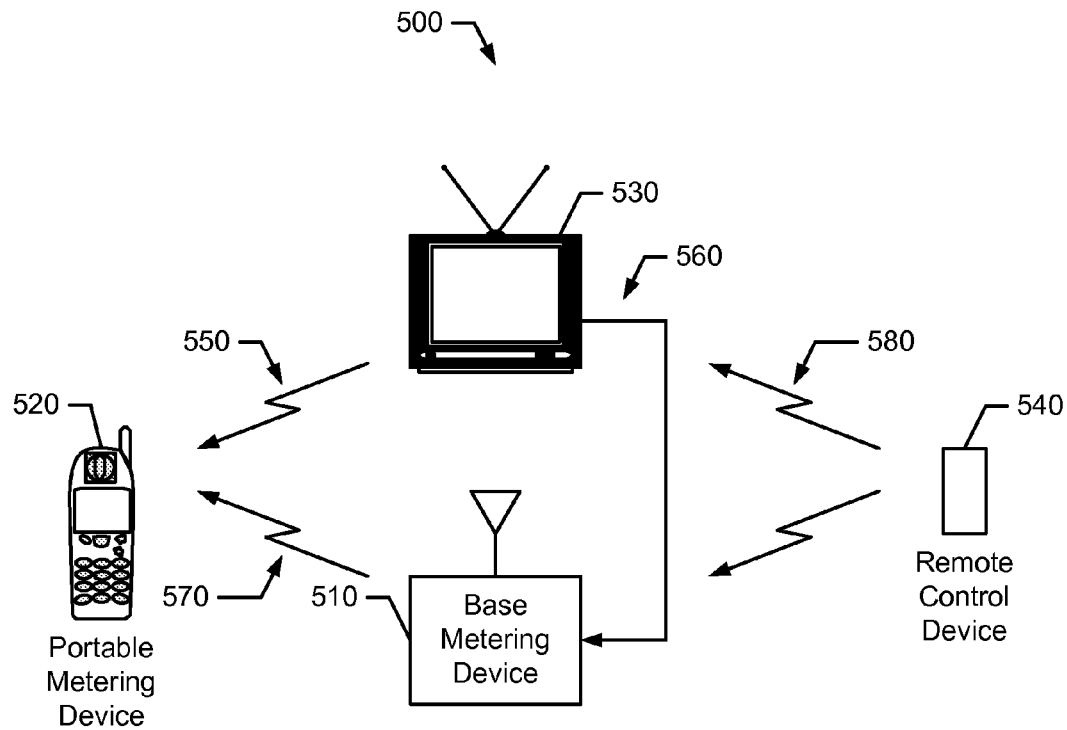
FIG. 5 depicts an example usage information system associated with the example media monitoring system of FIG. 1.

Referring to FIG. 5, an example usage information system 500 may include a base metering device 510, a portable metering device 520, and a media delivery device 530. In general, the base metering device 510 is configured to monitor for a signal indicative of a media delivery event associated with the media delivery device 530 (e.g., a tuning signal and/or an operating mode signal). For example, the media delivery event may be a tuning event such as a change in channel to which the media delivery device 530 is tuned, a change in audio output or volume of the media delivery device 530, etc. The media delivery event may also be a change in a web address, a web page, a web site, etc. currently presented by the media delivery device 530.

Typically, an individual or an audience member (e.g., the panelists 150 of FIG. 1) may have access to a remote control device 540 that may be used to cause, initiate, or terminate the media delivery event associated with the media delivery device 530. For example, the individual may press a button on the remote control device 540 to initiate a change in a channel to which the media delivery device 530 is tuned. In another example, the individual may speak a voice command recognized by the remote control device 540 via a voice recognition device (not shown) to initiate the change in channel to which the media delivery device 530 is tuned. Alternatively, the individual (e.g., the panelists 150 of FIG. 1) may cause, initiate, or terminate the media delivery event without using the remote control device 540 by directly adjusting the media delivery device 530 in a conventional manner such as, for example, by pressing a button, turning a knob, flipping a lever, etc. on the media delivery device 530. The media delivery device 530 may also include a voice recognition device (not shown), which the individual may use to enable/disable the media delivery event by speaking a voice command recognized by the voice recognition device.

The media delivery event may also be an operating mode event such as, for example, a change in an operating mode of the media delivery device 530. While operating in a normal viewing mode, the media delivery device 530 typically provides a single video output and a corresponding audio output. However, the media delivery device 530 may provide other operating modes in which there is not a one-to-one correspondence between video and audio outputs. In contrast to the normal viewing mode, for example, the media delivery device 530 may provide a video output and no audio output when operating in a mute mode and/or or a PC mode (e.g., video output by a PC). In another example, the media delivery device 530 may provide two or more video outputs but only one audio output when operating in a PIP mode (e.g., a smaller screen within a main screen) and/or a split-screen mode (e.g., two screens divided horizontally or vertically).

The media delivery device 530 may also operate in other modes in which the media delivery device 530 indirectly provides video and/or audio outputs by using external components and/or devices such as, for example, an amplifier component and/or external speakers (not shown) to implement a surround-sound mode. Accordingly, any speakers integral with or internal to the media delivery device 530 (hereinafter "internal speakers") may be turned off so that the media delivery device 530 uses the external speakers to deliver or present audio output to the panelist 150 (i.e., the media delivery device 530 only delivers or presents video output directly to the panelist 150). The internal speakers of the media delivery device 530 may also be turned off when the panelist 150 plugs in a set of headphones/earphones to the media delivery device 530 (e.g., the headphones/earphones mode). In that case, the media delivery device 530 may only deliver video output directly to the panelist 150 and use the headphones/earphones to deliver audio output to the panelist 150.

Based on the tuning signal and/or the operating mode signal, the base metering device 510 may generate usage information indicative of a media delivery event (e.g., a tuning event and/or an operating mode event) associated with the media delivery device 530. The usage information is indicative of a manner in which the media delivery device 530 is used. As described above, the media delivery device 530 may operate to tune to a particular channel, to provide a particular volume, etc. based on an operating mode. As noted above, the media delivery device 530 may tune to a channel to provide video output and audio output of media content such as, for example, a television program, when operating in the normal viewing mode. In another example, the media delivery device 530 may only provide video output when operating in the mute mode. Accordingly, the base metering device 510 may transmit the usage information to the portable metering device 520 to collect media consumption data as described in detail below.

The portable metering device 520 is configured to receive media information 550 from the media delivery device 530. For example, the media information 550 may include an audio code, a video code, an audio signature, a video signature, and/or other media measurement information. In general, the portable metering device 520 is configured to generate a probability factor indicative of a probability that the media information 550 is associated with a previously tuned channel as described in connection with FIGS. 2, 3, and 4. Based on the usage information from the base metering device 510 and/or the probability factor, the portable metering device 520 may determine whether it is proper to associate the media information 550 with the previously tuned channel. The portable metering device 520 may associate the media information to the previously tuned channel in response to failing to receive usage information indicative of a change in channel to which the media delivery device 530 is tuned. On the other hand, the portable metering device 520 may reset the probability factor in response to receiving usage information indicative of a change in channel to which the media delivery device 530 is tuned. As noted above, the probability factor may cause the portable metering device 520 to associate the media information 550 with the previously tuned channel. By resetting the probability factor as described in detail below and in connection with FIG. 9, the portable metering device 520 may associate the media information 550 with a newly tuned channel instead of the previously tuned channel.

While the portable metering device 520 is depicted as a portable telephone in FIG. 5, the portable metering device 520 may be implemented using other portable electronic platforms configured to collect media consumption data. For example, the portable metering device 520 may be a personal digital assistant, a handheld computer, a pager, etc. Further, although the media delivery device 530 is depicted as a television in FIG. 5, the media delivery device 530 may be other electronic devices used for media delivery. For example, the media delivery device 530 may be a video monitor, a multimedia PC, etc.

Figure 6:
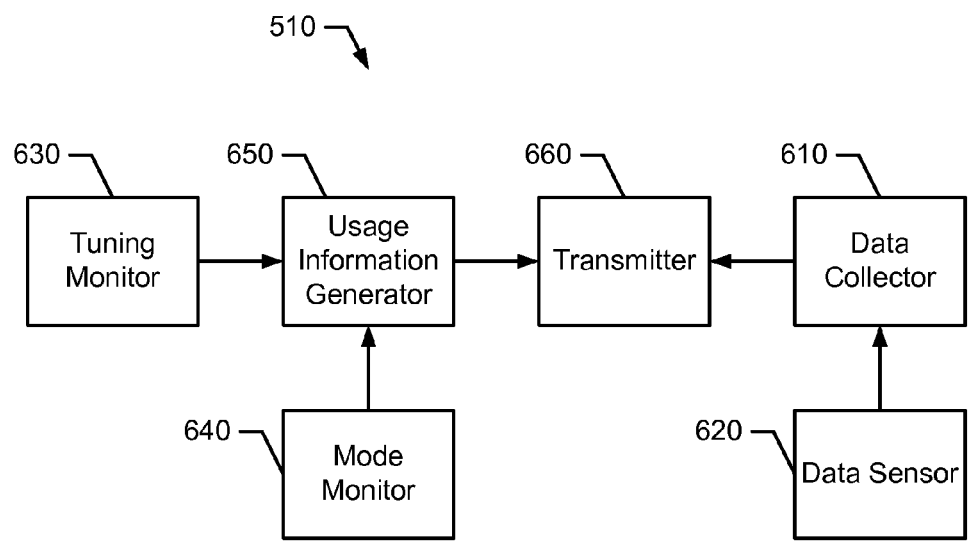
FIG. 6 is a detailed block diagram representation of an example base metering device that may be used with the example usage information system of FIG. 5.

As shown in FIG. 5, the base metering device 510 is communicatively coupled to the media delivery device 530 via a first communication link 560 (e.g., a hardwire link) to receive an event signal indicative of a media delivery event associated with the media delivery device 530 (e.g., a tuning signal and/or an operating mode signal). In the example of FIG. 6, the base metering device 510 may include a data sensor 610, a data collector 620, a tuning monitor 630, a mode monitor 640, a usage information generator 650, and a transmitter 660. The data sensor 610 and the data collector 620 are configured to monitor and collect media information from the media delivery device 530 to form media consumption data in a known manner. The transmitter 660 may transmit the media consumption data from the data collector 620 via the network 170 (FIG. 1) to the data collection facility 180.

The tuning monitor 630 is configured to monitor for a tuning signal from the media delivery device 530 and the mode monitor 640 is configured to monitor for an operating mode signal from the media delivery device 530 via the first communication link 560 (FIG. 5). In response to receiving event signals (e.g., tuning signals, operating mode signals, etc.), the usage information generator 650 generates usage information to alert the portable metering device 520 of media delivery events associated with the media delivery device 530. For example, a media delivery event may be a change in channel to which the media delivery device 530 is tuned and/or a change in volume at which the media delivery device 530 is operated (i.e., an increase or decrease in volume). The media delivery event may also be a change in operating mode in which the media delivery device 530 is operated such as, for example, a PIP mode, a split-screen mode, a mute mode, a headphones/earphones mode, a PC mode, etc. The transmitter 660 is configured to transmit the usage information to the portable metering device 520 via a second communication link 570 (FIG. 5) such as a wireless link.

Alternatively, the base metering device 510 may receive the event signal from a remote control device 540. For example, the base metering device 510 may be communicatively coupled to the remote control device 540 via a third communication link 580. As noted above, the remote control device 540 is configured to change the channel to which the media delivery device 530 is tuned, the volume at which the media delivery device 530 is operated, etc. When the remote control device 540 transmits the event signal to the media delivery device 530, the base metering device 510 may receive the event signal from remote control device 540 via the third communication link 580. The third communication link 580 may be a wireless link such as an infrared link, radio frequency (RF) link, etc. For example, the third communication link 580 may be operated in accordance with an Infrared Data Association (IrDA) based communication protocol, a Bluetooth-based communication protocol, etc. To receive the event signal from the remote control device 540 via an infrared link, the base metering device 510 may be disposed proximate to the media delivery device 530 and within a line-of-sight of the remote control device 540. In contrast to an implementation based on an infrared link, with an RF-based link, the base metering device 510 may not need to be disposed proximate to the media delivery device 530 or within a line-of-sight of the remote control device 540 to receive the tuning signal and/or the operating mode signal from the remote control device 540 because RF signals conveyed via the RF-based link may pass through objects such as an individual, a wall, a sofa, etc.

By receiving a tuning signal via the third communication link 580, the base metering device 510 may receive a signal from the remote control device 540 that is indicative of an attempt to change a channel to which the media delivery device 530 is tuned instead of a signal indicative of an actual change in channel. In particular, the media delivery device 530 may not receive the event signal from the remote control device 540 via the third communication link 580 because of an obstruction (e.g., a wall) and/or interference (e.g., an infrared signal from another source) between the media delivery device 530 and the remote control device 540. However, the obstruction and/or interference does not interfere with the first communication link 560 because the base metering device 510 is coupled directly to the media delivery device 530 via a hardwire link.

The base metering device 510 may also be configured to determine whether the media delivery device 530 is turned off or on but either delivering audio output indirectly to the panelist 150 (e.g., via headphones/earphones) or not delivering audio output at all (e.g., a mute mode). In particular, the mode monitor 640 is configured to monitor for audio output from the media delivery device 530 to determine whether the media delivery device 530 is turned on. The mode monitor 640 may include a condenser microphone, a piezoelectric microphone or any other suitable transducer configured to convert acoustic waves into electrical signals. For example, the mode monitor 640 may monitor for audio output from the internal speakers of the media delivery device 530. If the mode monitor 640 detects audio output from the internal speakers, the usage information generator 650 generates usage information indicative of the media delivery device 530 being turned on. On the other hand, if the mode monitor 640 fails to detect audio output from the internal speakers, the media delivery device 530 may be turned on but operating in a mode that indirectly delivers audio output to the panelist 150 via an external source such as headphones/earphones (e.g., via the headphones/earphones mode) or via a mode that does not deliver audio output at all to the panelist 150 (e.g., the mute mode). The mode monitor 640 may determine whether the media delivery device 530 is turned on by monitoring for a sweep frequency signal as is disclosed in U.S. patent application Ser. No. 11/037,277. For example, the sweep frequency signal may be a 15.75 kilo-hertz (kHz) horizontal scan fly-back transformer sweep signal for a conventional television, or a 31.5 kHz sweep signal for high-definition television or other television. If the mode monitor 640 detects a sweep frequency signal, the usage information generator 650 may generate usage information indicative of the media delivery device 530 being turned on but not delivering audio output directly or at all to the panelist 150.

Alternatively, the base metering device 510 may use other methods to determine whether media delivery device 530 is turned on but not delivering audio output directly or at all to the panelist 150. For example, the base metering device 510 may be configured to monitor power consumption by the media delivery device 530. In another example, the base metering device 510 may be configured to monitor light emitted from a screen or display of the media delivery device 530 as is disclosed in PCT Patent Application No. US03/30370 and PCT Patent Application No. US03/30355.

While the base metering device 510 is depicted in FIGS. 5 and 6 as a relatively stationary metering device configured to monitor for media information from the media delivery device 530 (e.g., via the data sensor 610 and the data collector 620), the base metering device 510 may be replaced with a device configured to monitor and transmit usage information associated with the media delivery device 530 to the portable metering device 520. For example, the base metering device 510 may be replaced with a device that does not perform functions associated with the data sensor 610 and the data collector 620. Further, although the components shown in FIG. 6 are depicted as separate blocks within the base metering device 510, the functions performed by some of these blocks may be integrated within a single semiconductor circuit or may be implemented using two or more separate integrated circuits. For example, although the tuning monitor 630 and the mode monitor 640 are depicted as separate blocks, the tuning monitor 630 and the mode monitor 640 may be integrated within a single component. In addition, the tuning monitor 630 and the mode monitor 640 may be replaced with one or more receivers configured to receive an event signal only (i.e., the base metering device 510 may be a device that only provides usage information to the portable metering device 520 and does not monitor for media information from the media delivery device 530).

Figure 7:
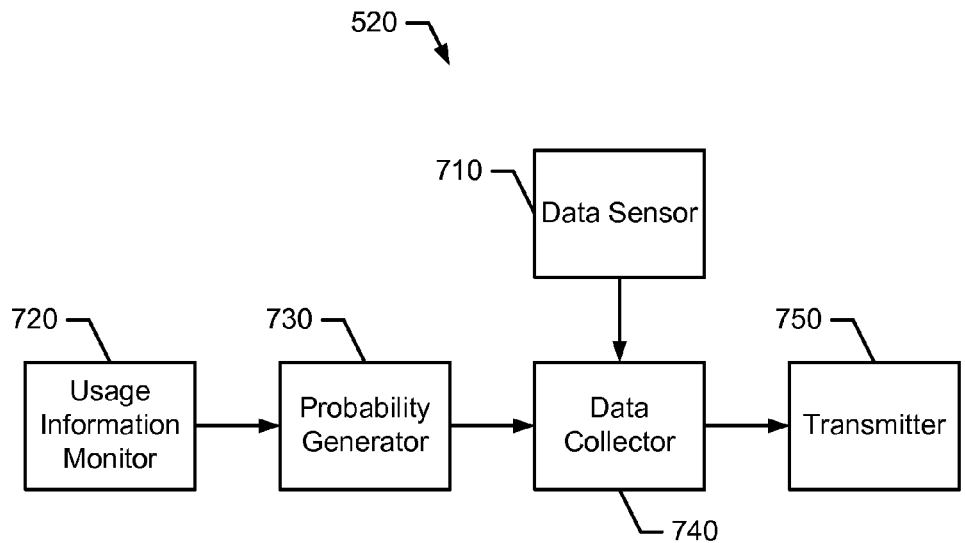
FIG. 7 is a detailed block diagram representation of an example portable metering device that may be used with the example usage information system of FIG. 5.

In the example of FIG. 7, the portable metering device 520 may include a data sensor 710, a usage information monitor 720, a probability generator 730, and a data collector 740. The data sensor 710 is configured to receive the media information 550 from the media delivery device 530. For example, the data sensor 710 may include an optical sensor (e.g., a photodetector, a photodiode, and/or a light-sensitive semiconductor junction device) and/or an acoustic sensor (e.g., a microphone) to receive the media information 550.

The usage information monitor 720 is configured to monitor for usage information from the base metering device 510. As noted above, the usage information may include information indicative of a media delivery event associated with the media delivery device 530. For example, the usage information monitor 720 may receive information indicative of a change in channel to which the media delivery device 530 is tuned. Based on the usage information from the base metering device 510, the usage information monitor 720 may reset the probability generator 730 as described in detail below.

As noted above, the portable metering device 520 may implement a probability protocol or algorithm to generate a probability factor to predict and identify a SID corresponding to a tuned channel without having received a complete sequence of the SID (e.g., received a partial SID). The probability generator 730 is configured to generate a probability factor as described above in connection with FIGS. 2, 3, and 4. In particular, the probability factor may be used by the data collector 740 to associate the media information 550 with a previously tuned channel. By resetting the probability factor to zero, the data collector 740 may associate the media information 550 with a newly tuned channel after a change in channel instead of the previously tuned channel to form the media consumption data as described in detail below. The transmitter 750 may transmit the media consumption data to the base metering device 510 and/or to the data collection facility 180.

While the components shown in FIG. 7 are depicted as separate blocks within the portable metering device 520, the functions performed by some of these blocks may be integrated within a single semiconductor circuit or may be implemented using two or more separate integrated circuits. For example, although the usage information monitor 710, the data sensor 720, the probability generator 730, and the data collector 740 are depicted as separate blocks within the portable metering device 520, the usage information monitor 710 may be integrated into the data sensor 720, the probability generator 730, and/or the data collector 740. In addition, the usage information monitor 710 may be replaced with a receiver only configured to receive usage information (i.e., a device that does not perform any monitoring functions).

Figure 8:
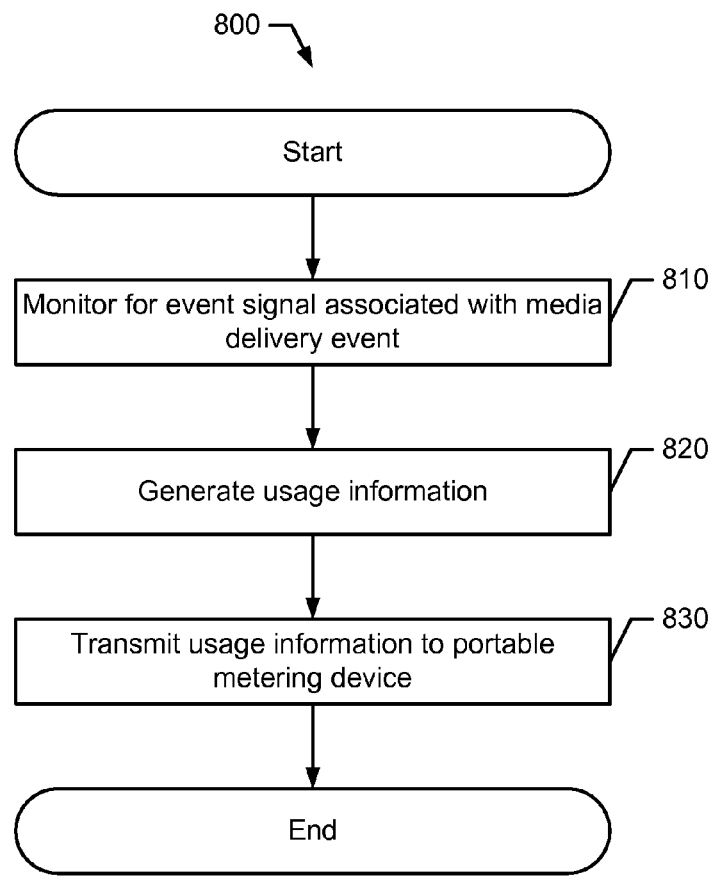
FIG. 8 is a flow diagram representation of one manner in which the example base metering device of FIG. 6 may be configured.
Figure 9:
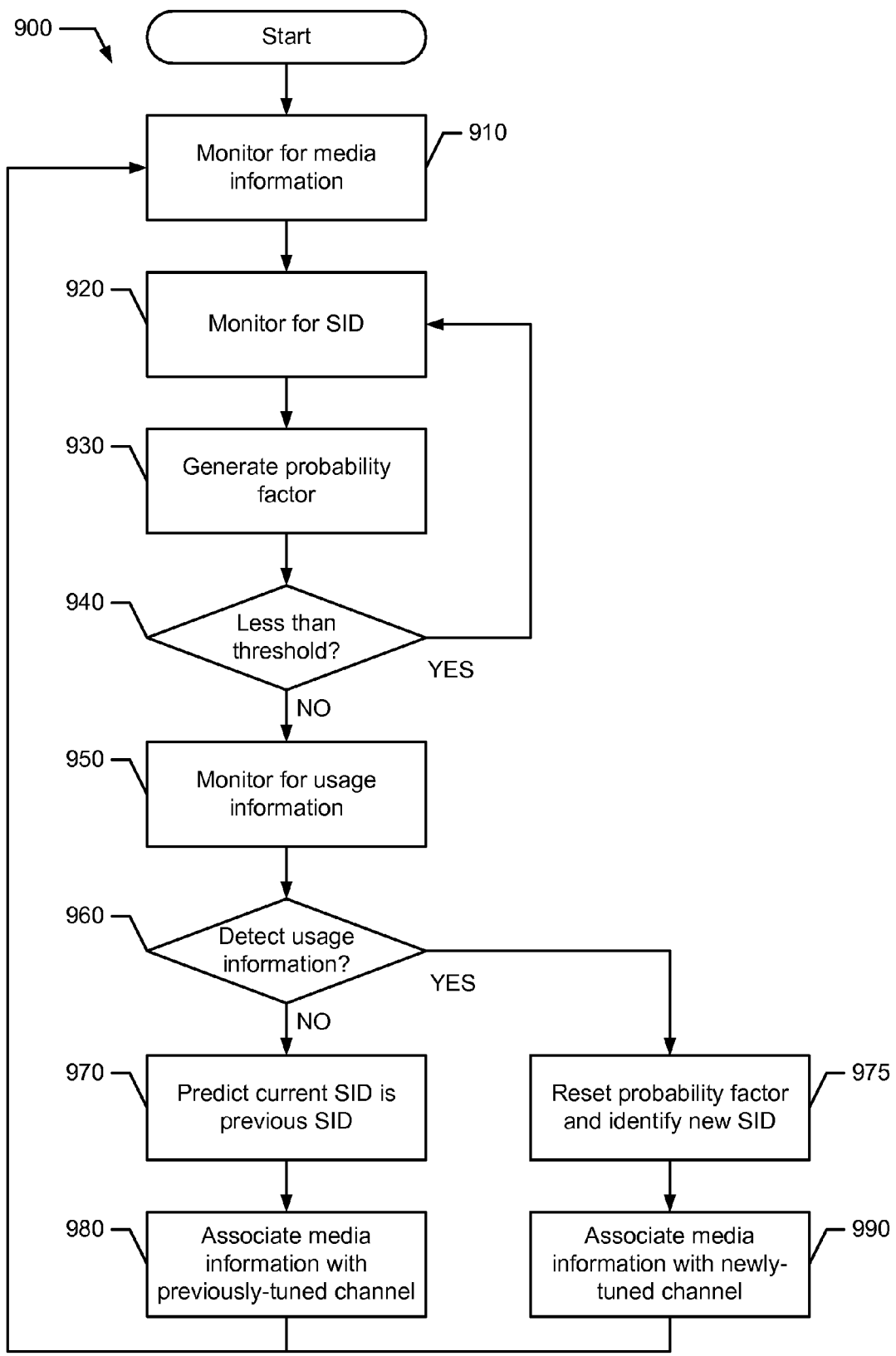
FIG. 9 is a flow diagram representation of one manner in which the example portable metering device of FIG. 7 may be configured.

FIGS. 8 and 9 depict one manner in which the example base metering device 510 of FIG. 6 and the portable metering device 520 of FIG. 7 may be configured to collect media consumption data based on usage information of a media delivery device. The example processes of FIGS. 8 and 9 may be implemented as machine accessible instructions utilizing any of many different programming codes stored on any combination of machine-accessible media such as a volatile or nonvolatile memory or other mass storage device (e.g., a floppy disk, a CD, and a DVD). For example, the machine accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of actions is illustrated in FIGS. 8 and 9, these actions can be performed in other temporal sequences. Again, the processes 800 and 900 are merely provided and described in conjunction with the components of FIGS. 5, 6, and 7 as an example of one way to configure a system to collect media consumption data based on usage information of a media delivery device.

In the example of FIG. 8, the process 800 begins with the base metering device 510 monitoring for an event signal indicative of a media delivery event associated with the media delivery device 530. In particular, the base metering device 510 (e.g., via the tuning monitor 630 and/or the mode monitor 640) monitors for a tuning signal indicative of a tuning event associated with the media delivery device 530 and/or an operating mode signal indicative of an operating mode event associated with the media delivery device 530 (block 810). For example, the tuning event may be a change in channel to which the media delivery device 530 is tuned and/or a change in volume at which the media delivery device 530 is operated. Alternatively, the tuning event may be a change in a web address, a web page, a web site, etc. currently presented by the media delivery device 530. The operating mode event may be an initiation of an operating mode that causes the media delivery device 530 to change the manner in which it outputs media (e.g., its video output and/or audio output) to the panelist 150. In particular, the operating mode may be a mute mode, a headphones/earphones mode, a PC mode, a PIP mode, a split-screen mode, etc. in which the media delivery device 530 does not deliver audio output directly or at all to the panelist 150. For example, the media delivery device 530 may use headphones/earphones and/or external speakers to deliver audio output to the panelist 150. Based on the media delivery event, the usage information generator 650 of the base metering device 510 may generate usage information to inform the portable metering device 520 of the manner in which the media delivery device 530 is being used (block 820).

As described in detail below, the usage information may be used by the portable metering device 520 to collect media consumption data more accurately in view of the manner in which one or more audience members or panelists 150 use the media delivery device 530. For example, the portable metering device 520 may associate the media delivery device 550 to a newly tuned channel instead of a previously tuned channel in response to a media delivery event that indicates a change in channel to which the media delivery device 530 is tuned. In another example, the audio volume of the media delivery device 530 may be reduced to a level that the portable metering device 520 may not detect any audio output from the media delivery device 530 but the panelist 150 may still be consuming media from the media delivery device 530. Thus, the portable metering device 520 may continue to monitor for the media information 550 and associate the media information 550 with a channel to which the media delivery device 530 is tuned in response to the reduction in volume. Accordingly, the base metering device 510 may transmit (e.g., via the transmitter 660) the usage information to the portable metering device 520 (block 830) to collect media consumption data as described in conjunction with FIG. 9.

Referring to FIG. 9, the process 900 begins with the data sensor 710 of the portable metering device 520 monitoring for the media information 550 from the media delivery device 530 (block 910). For example, the data sensor 710 may detect a video code, an audio code, a video signature, an audio signature and/or other media measurement information. The data sensor 710 may also monitor for a SID corresponding to a channel to which the media delivery device 530 is tuned (i.e., a current SID) (block 920). However, the data sensor 710 may only receive a portion of the current SID as a result of receiving corrupted data, a shortened capture period, etc. Instead of having to receive a complete SID before identifying the current SID, the portable metering device 520 may implement a probability protocol to fill in missing portion(s) of the current SID. As described above in connection with FIGS. 2, 3, and 4, the portable metering device 520 may identify the current SID without having received the complete current SID. In particular, the probability generator 730 may generate a probability factor indicative of the likelihood that a current SID is the same as a previous SID based on the received portion of the current SID (block 930). In particular, the previous SID corresponds to a previously tuned channel of the media delivery device 530. Accordingly, the probability factor may cause the data collector 740 to associate received media information (e.g., the media information of 550) with the previously tuned channel. The probability generator 730 may determine whether the probability factor generated at block 930 is less than a predefined probability threshold (block 940) because the probability generator 730 may require more code associated with the current SID to generate the probability factor. That is, the probability factor may indicate a likelihood that is too low to predict that the current SID is the same as the previous SID. Thus, if the probability factor is less than the probability threshold, the probability generator 730 returns to block 920 to monitor for more code associated with the current SID (e.g., another digit of the SID). Alternatively, the probability generator 730 may determine whether the portion of the current SID received block 920 is greater than or equal to a threshold indicative of a sufficient quantity of code associated with the current SID to generate the probability factor. If the received portion is greater than or equal to the threshold, the probability generator 730 may generate the probability factor. Otherwise, if the received portion is less than the threshold, control returns to block 920 to monitor for more code associated with the current SID before the probability generator 730 may generate the probability factor.

Referring back to block 940, if the probability factor is greater than or equal to the probability threshold, the usage information monitor 720 may monitor for usage information from the base metering device 510 (block 950) and determine whether to reset the probability factor generated by the probability generator 730 at block 930 (block 960). For example, the usage information may indicate a change in channel to which the media delivery device 530 is tuned. If the usage information monitor 720 fails to receive usage information from the base metering device 510, the probability generator 730 may predict that the current SID is the same as the previous SID (block 970). As a result, the data collector 740 may associate received media information with the previously tuned channel (block 980). Control returns to block 910 to process other media information as described above.

Otherwise, if the usage information monitor 720 receives the usage information, the usage information monitor 720 may reset the probability factor to zero and identify the current SID as a new SID (block 975). A probability factor of zero indicates that the current SID is not the same as the previous SID. The portable metering device 520 may be configured to wait and receive the entire sequence of the current SID (e.g., all three digits) before identifying the new SID. The new SID corresponds to a newly tuned channel of the media delivery device 530. As a result, the data collector 740 may associate the media information with a newly tuned channel instead of the previously tuned channel (block 990). Control returns to block 910 to process other media information as described above.

As noted above, the media delivery device 530 may operate in various modes in which the media delivery device 530 does not deliver audio output directly or at all to the panelist 150. For example, the panelist 150 may initiate the mute mode of the media delivery device 530 when the panelist 150 is using the telephone and/or when the panelist 150 desires to initiate a closed caption feature of the media delivery device 530 (e.g., a text version of audio output is presented on-screen by the media delivery device 530). Even though the media delivery device 530 does not deliver audio output to the panelist 150 in the mute mode, the panelist 150 may continue to consume media because the media delivery device 530 may deliver video output to the panelist 150. In that case, the portable metering device 520 may collect media consumption data as described in connection with FIG. 10.

Figure 10:
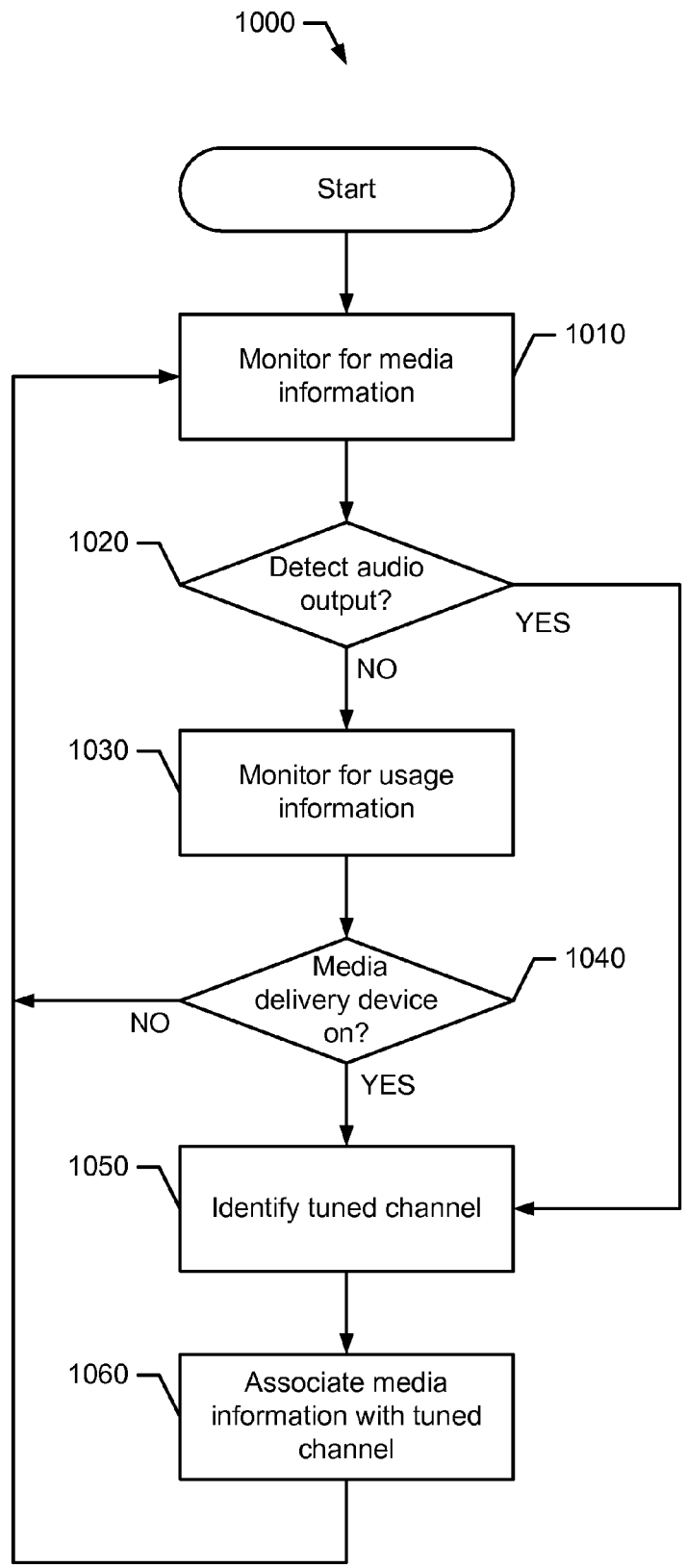
FIG. 10 is a flow diagram representation of another manner in which the example portable metering device of FIG. 7 may be configured.

Referring to FIG. 10, the process 1000 is merely provided and described in conjunction with the components of FIGS. 5, 6, and 7 as an example of one way to program a processor to collect media consumption data in various operating modes of the media delivery device 530 in which the media delivery device 530 does not deliver audio output directly or at all to the panelist 150. The process 1000 begins with the data sensor 510 at the portable metering device 520 monitoring for the media information 550 from the media delivery device 530 (block 1010). Based on media information 550 received by the portable metering device 520, the data sensor 710 determines whether the media delivery device 530 is delivering audio output (block 1020). If the media delivery device 530 is delivering audio output, the data collector 740 may identify a tuned channel of the media delivery device 530 (block 1050). For example, the portable metering device 520 may implement the probability protocol as described herein to identify the tuned channel as a previously tuned channel or a newly tuned channel. Accordingly, the data collector 740 may associate the media information 550 with the tuned channel identified at block 1050 to form media consumption data (block 1060).

Otherwise, if the data sensor 710 determines that the media delivery device 530 fails to deliver audio output at block 1020, the usage information monitor 720 monitors for usage information from the base metering device 510 (block 1030). The usage information may include information indicative of an operating mode event associated with the media delivery device 530. For example, the usage information may indicate that the media delivery device 530 is operating in the mute mode in which the media delivery device 530 is turned on but does not deliver audio output. In another example, the usage information may indicate that the media delivery device 530 is operating in the headphones/earphones mode in which the media delivery device is turned on but delivering audio output indirectly to the panelist 150 via a set of headphones/earphones (i.e., the media delivery device 530 is not delivering audio output via its internal speakers). Based on the usage information, the usage information monitor 720 determines whether the media delivery device 530 is turned on (block 1040). As mentioned above, the base metering device 510 may determine whether the media delivery device 530 is turned on by monitoring for a sweep frequency signal, power consumption, and/or light emission of the media delivery device 530. If the portable metering device 520 receives usage information indicative of the media delivery device 530 being turned off, control returns to block 1010 to monitor for the media information 550. Otherwise, if the portable metering device 520 receives usage information indicative of the media delivery device 530 being turned on, the data collector 740 may identify the tuned channel (block 1050) and associate the media information 550 with the tuned channel to form media consumption data (block 1060).

Figure 11:
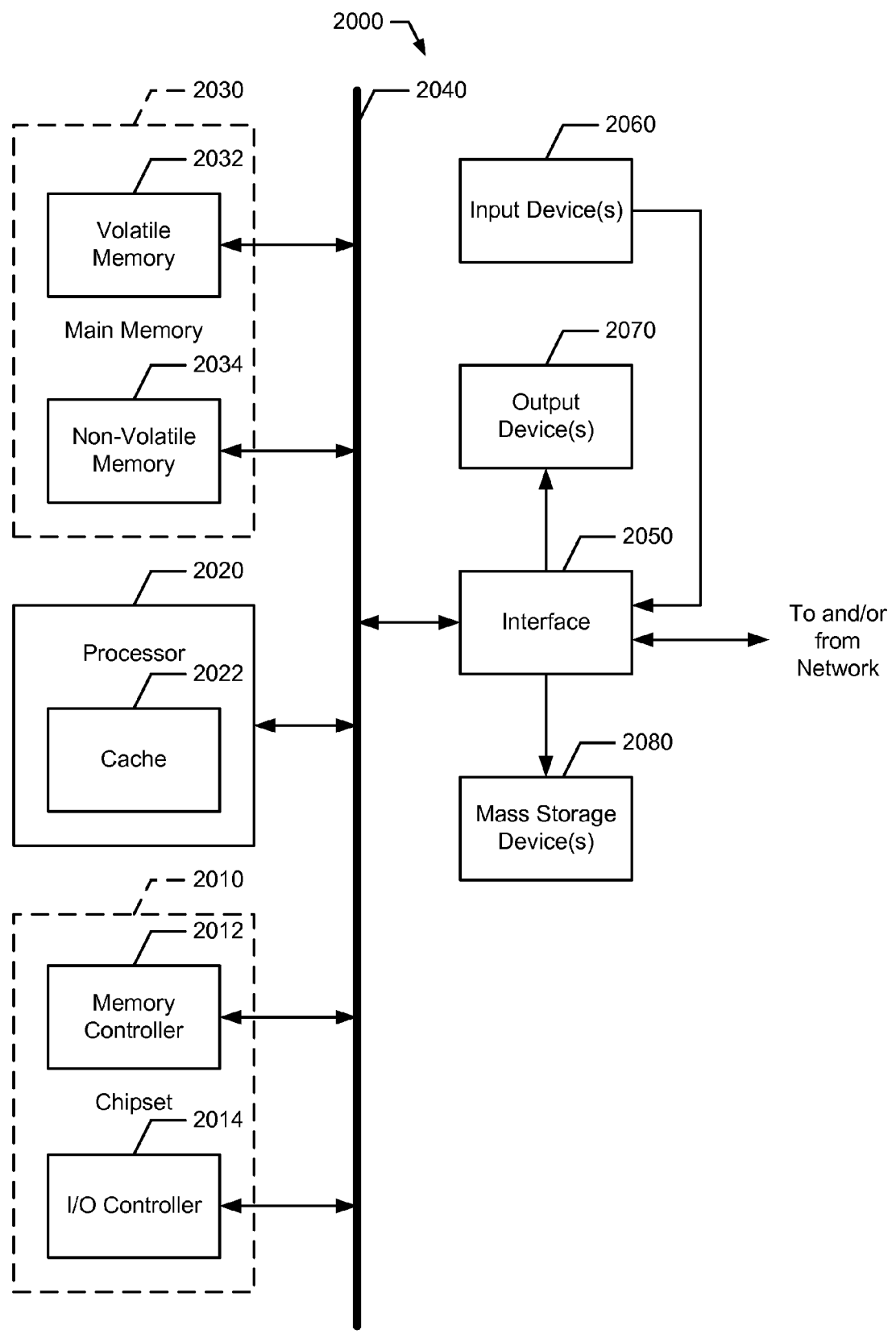
FIG. 11 a block diagram representation of an example processor system that may be used to implement the methods and apparatus described herein.

FIG. 11 is a block diagram of an example processor system 2000 adapted to implement the methods and apparatus disclosed herein. The processor system 2000 may be a desktop computer, a laptop computer, a notebook computer, a personal digital assistant (PDA), a server, an Internet appliance or any other type of computing device.

The processor system 2000 illustrated in FIG. 11 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors. In the alternative, other processing technology may be used to implement the processor 2020. The processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit a user to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by media presentation devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 11 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

In addition, while this disclosure is made with respect to example television systems, it should be understood that the disclosed system is readily applicable to many other media systems. Accordingly, while this disclosure describes example systems and processes, the disclosed examples are not the only way to implement such systems.

Further, although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents. For example, although this disclosure describes example systems including, among other components, software executed on hardware, it should be noted that such systems are merely illustrative and should not be considered as limiting. In particular, it is contemplated that any or all of the disclosed hardware and software components could be embodied exclusively in dedicated hardware, exclusively in firmware, exclusively in software or in some combination of hardware, firmware, and/or software.

What is claimed is:

1. A method for collecting media consumption data comprising:
    receiving media information at a portable metering device;
    generating a probability factor associated with a first channel of a media delivery device based on the received media information;
    monitoring via the portable metering device for usage information indicative of a media delivery event associated with the media delivery device; and
    changing the probability factor and associating the media information with a second channel of the media delivery device based on the usage information to form the media consumption data.

2. A method as defined in claim 1, wherein the portable metering device is associated with a monitored individual.

3. A method as defined in claim 1, wherein monitoring via the portable device for the usage information comprises receiving information sent by a remote control device associated with the media delivery device.

4. A method as defined in claim 3, wherein receiving the information sent by the remote control device comprises receiving information sent via an infrared communication link.

5. A method as defined in claim 1, wherein changing the probability factor comprises resetting the probability factor.

6. A method as defined in claim 1, wherein changing the probability factor and associating the media information with the second channel comprises associating the media information with the second channel in response to receiving the usage information.

7. A method as defined in claim 1, wherein the first channel comprises a previously tuned channel, and wherein the second channel comprises a newly tuned channel.

8. A method as defined in claim 1, wherein the media delivery event comprises at least one of a tuning event or an operating mode event.

9. A method as defined in claim 1, wherein the usage information comprises information associated with at least one of a change in channel to which the media delivery device is tuned or a change in volume at which the media delivery device is operated.

10. A method as defined in claim 1, wherein the usage information comprises information associated with at least one of a mute mode, a headphones/earphones mode, a personal computer mode, a picture-in-picture mode, or a split-screen mode.

11. A method as defined in claim 1, wherein the portable metering device comprises at least one of a portable telephone platform, a personal digital assistant platform, or a handheld computer platform.

12. A method as defined in claim 1, wherein the media information comprises at least one of a video code, an audio code, a video signature, or an audio signature from a media delivery device.

13. A method as defined in claim 12, wherein the media delivery device comprises at one of a television or a multimedia personal computer.

14. A method as defined in claim 1 further comprising transmitting the media consumption data to a data collection facility.

15. An apparatus for collecting media consumption data comprising:
    a sensor configured to receive media information at a portable metering device;
    a probability generator to generate a probability associated with a first channel of a media delivery device;
    a monitor configured to monitor for usage information indicative of a media delivery event associated with the media delivery device; and
    a data collector configured to change the probability factor and associate the media information with a second channel of the media delivery device based on the usage information to form the media consumption data.

16. An apparatus as defined in claim 15, wherein the portable metering device is associated with a monitored individual.

17. An apparatus as defined in claim 15, wherein the monitor is configured to monitor for the usage information by receiving information sent by a remote control device associated with the media delivery device.

18. An apparatus as defined in claim 17, wherein the information sent by the remote control device comprises information sent via an infrared communication link.

19. An apparatus as defined in claim 15, wherein the data collector is configured to change the probability factor by resetting the probability factor.

20. An apparatus as defined in claim 15, wherein the data collector is configured to change the probability factor and associate the media information with the second channel in response to receiving the usage information.

21. An apparatus as defined in claim 15, wherein the first channel comprises a previously tuned channel, and wherein the second channel comprises a newly tuned channel.

22. An apparatus as defined in claim 15, wherein the media delivery event comprises at least one of a tuning event or an operating mode event.

23. An apparatus as defined in claim 15, wherein the usage information comprises information associated with at least one of a change in channel to which the media delivery device is tuned or a change in volume at which the media delivery device is operated.

24. An apparatus as defined in claim 15, wherein the usage information comprises information associated with at least one of a mute mode, a headphones/earphones mode, a personal computer mode, a picture-in-picture mode, or a split-screen mode.

25. An apparatus as defined in claim 15, wherein the sensor comprises at least one of an optical sensor or an acoustic sensor.

26. An apparatus as defined in claim 25, wherein the optical sensor comprises at least one of a photodetector, a photodiode, or a light-sensitive semiconductor junction device.

27. An apparatus as defined in claim 25, wherein the acoustic sensor comprises a microphone.

28. An apparatus as defined in claim 15, wherein the portable metering device comprises at least one of a portable telephone platform, a personal digital assistant platform, or a handheld computer platform.

29. An apparatus as defined in claim 15, wherein the media information comprises at least one of a video code, an audio code, a video signature, or an audio signature from the media delivery device.

30. An apparatus as defined in claim 15, wherein the media delivery device comprises at least one of a television or a multimedia personal computer.

31. An apparatus as defined in claim 15 further comprising a communication interface configured to transmit the media consumption data to a data collection facility.

32. A machine accessible medium having instructions, which when executed, cause a machine to:
    receive media information at a portable metering device;
    generate a probability factor associated with a first channel of a media delivery device;
    monitor via the portable metering device for usage information indicative of a media delivery event associated with the media delivery device; and
    change the probability factor and associate the media information with a second channel of the media delivery device based on the usage information to form the media consumption data.

33. A machine accessible medium as defined in claim 32, wherein the portable metering device is associated with a monitored individual.

34. A machine accessible medium as defined in claim 32, wherein the instructions, when executed, cause the machine to monitor via the portable device for the usage information by receiving information sent by a remote control device associated with the media delivery device.

35. A machine accessible medium as defined in claim 34, wherein the information sent by the remote control device is sent via an infrared communication link.

36. A machine accessible medium as defined in claim 32, wherein the instructions, when executed, cause the machine to change the probability factor by resetting the probability factor.

37. A machine accessible medium as defined in claim 32, wherein the instructions, when executed, cause the machine to change the probability factor and associate the media information with the second channel by associating the media information with the second channel in response to receiving the usage information.

38. A machine accessible medium as defined in claim 32, wherein the first channel comprises a previously tuned channel, and wherein the second channel comprises a newly tuned channel.

39. A machine accessible medium as defined in claim 32, wherein the media delivery event comprises at least one of a tuning event or an operating mode event.

40. A machine accessible medium as defined in claim 32, wherein the usage information comprises information associated with at least one of a change in channel to which the media delivery device is tuned or a change in volume at which the media delivery device is operated.

41. A machine accessible medium as defined in claim 32, wherein the usage information comprises information associated with at least one of a mute mode, a headphones/earphones mode, a personal computer mode, a picture-in-picture mode, or a split-screen mode.

42. A machine accessible medium as defined in claim 32, wherein the portable metering device comprises at least one of a portable telephone platform, a personal digital assistant platform, or a handheld computer platform.

43. A machine accessible medium as defined in claim 32, wherein the media information comprises at least one of a video code, an audio code, a video signature, or an audio signature from a media delivery device.

44. A machine accessible medium as defined in claim 32, wherein the media delivery device comprises at one of a television or a multimedia personal computer.

45. A machine accessible medium as defined in claim 32, wherein the instructions, when executed, cause the machine to transmit the media consumption data to a data collection facility.

46. A machine accessible medium as defined in claim 32, wherein the machine accessible medium is one of a programmable gate array, application specific integrated circuit, erasable programmable read only memory, read only memory, random access memory, magnetic media, or optical media.

47. An apparatus for collecting media consumption data comprising:
means for receiving media information at a portable metering device;
means for generating a probability factor associated with a first channel of a media delivery device;
means for monitoring via the portable metering device for usage information indicative of a media delivery event associated with the media delivery device; and
means for changing the probability factor and associating the media information with a second channel of the media delivery device based on the usage information to form the media consumption data.

48. An apparatus as defined in claim 47, wherein the portable metering device is associated with a monitored individual.

49. An apparatus as defined in claim 47, wherein the means for monitoring via the portable device for the usage information comprises means for receiving information sent by a remote control device associated with the media delivery device.

50. An apparatus as defined in claim 49, wherein the means for receiving the information sent by the remote control device comprises means for receiving information sent via an infrared communication link.

51. An apparatus as defined in claim 47, wherein the means for changing the probability factor comprises means to reset the probability factor.

52. An apparatus as defined in claim 47, wherein the means for changing the probability factor and associating the media information with the second channel is configured to associate the media information with the second channel in response to receiving the usage information.

53. An apparatus as defined in claim 47, wherein the first channel comprises a previously tuned channel, and wherein the second channel comprises a newly tuned channel.

54. A system for collecting media consumption data comprising:
a usage monitoring device configured to monitor for a signal indicative of a media delivery event associated with a media delivery device, to generate usage information based on the media delivery event, and to transmit the usage information to one or more portable metering devices; and
a portable metering device configured to receive media information from the media delivery device, to monitor for the usage information from the usage monitoring device, to generate a probability factor associated with a channel to which the media delivery device was previously tuned, and to associate the media information with one of a first channel and a second channel based on the probability factor and the usage information to form media consumption data.

55. A system as defined in claim 54, wherein the portable metering device is configured to associate the media information with the first channel in response to failing to receive the usage information.

56. A system as defined in claim 54, wherein the portable metering device is configured to change the probability factor in response to receiving the usage information.

57. A system as defined in claim 54, wherein the portable metering device is configured to associate the media information with the second channel in response to receiving the usage information.

58. A system as defined in claim 54, wherein the probability factor is associated with the first channel.

59. A system as defined in claim 54, wherein the usage information comprises information associated with at least one of a change in channel to which the media delivery device is tuned or a change in volume at which the media delivery device is operated.

60. A system as defined in claim 54, wherein the usage information comprises information associated with at least of a mute mode, a headphones/earphones mode, a personal computer mode, a picture-in-picture mode, or a split-screen mode.

61. A system as defined in claim 54, wherein the usage monitoring device comprises a base metering device configured to collect media consumption data.

62. A system as defined in claim 61, wherein at least one of the base metering device and the portable metering device is configured to transmit the media consumption data to a data collection facility.

63. A method for collecting media consumption data comprising:
receiving media information at a portable metering device;
determining information associated with a likelihood a first channel of a media delivery device is currently tuned based on the received media information;
monitoring via the portable metering device for usage information indicative of a media delivery event associated with the media delivery device; and
associating the media information with a second channel of the media delivery device based on the information associated with the likelihood and the usage information to form the media consumption data.

64. A method as defined in claim 63, wherein determining the information associated with the likelihood comprises determining probability information.

65. A method as defined in claim 64, wherein determining the probability information comprises determining the probability information using at least one of a probability protocol or a probability algorithm.

66. A method as defined in claim 63, wherein monitoring via the portable metering device for the usage information comprises receiving information sent by a remote control device.

67. A method as defined in claim 66, wherein receiving information sent by the remote control device comprises receiving information sent via an infrared communication link.

* * * * *